US011999008B2

(12) United States Patent
Sakai et al.

(10) Patent No.: US 11,999,008 B2
(45) Date of Patent: Jun. 4, 2024

(54) LASER WELDING DEVICE AND LASER WELDING METHOD

(71) Applicant: Panasonic Intellectual Property Management Co., Ltd., Osaka (JP)

(72) Inventors: Toru Sakai, Hyogo (JP); Michio Sakurai, Osaka (JP); Takashi Urashima, Osaka (JP); Daichi Higashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 876 days.

(21) Appl. No.: 16/984,261

(22) Filed: Aug. 4, 2020

(65) Prior Publication Data

US 2020/0376591 A1 Dec. 3, 2020

Related U.S. Application Data

(63) Continuation of application No. PCT/JP2019/002613, filed on Jan. 28, 2019.

(30) Foreign Application Priority Data

Feb. 16, 2018 (JP) ................... 2018-025736

(51) Int. Cl.
*B23K 26/03* (2006.01)
*B23K 26/06* (2014.01)
(Continued)

(52) U.S. Cl.
CPC ........ *B23K 26/032* (2013.01); *B23K 26/0643* (2013.01); *B23K 26/0648* (2013.01);
(Continued)

(58) Field of Classification Search
CPC .... B23K 26/032; B23K 26/082; B23K 26/21; B23K 26/0643; B23K 26/0648; B23K 31/125; G01B 11/22
(Continued)

(56) References Cited

U.S. PATENT DOCUMENTS 4,367,017 A * 1/1983 Jimbou ................ B23K 26/035
359/857
6,791,057 B1 * 9/2004 Kratzsch ................ B23K 26/24
219/121.62
(Continued)

FOREIGN PATENT DOCUMENTS

JP 7-236987 9/1995
JP 2012-236196 12/2012
(Continued)

OTHER PUBLICATIONS

International Search Report of PCT application No. PCT/JP2019/002613 dated Apr. 16, 2019.
(Continued)

*Primary Examiner* — Jimmy Chou
(74) *Attorney, Agent, or Firm* — WENDEROTH, LIND & PONACK L.L.P.

(57) ABSTRACT

A laser welding device (10) for welding a weld part (35) with laser light (L) includes: a laser emitting head (20) overlapping the laser light (L) and a measurement light (S) coaxially with each other and applying the laser light (L) and the measurement light (S) to the weld part (35), the measurement light (S) having a wavelength different from a wavelength of the laser light (L); a first parallel plane plate and a second parallel plane plate, changing an irradiation position of the measurement light (S) such that the irradiation position orbitally move around a center of rotation that moves on a predetermined welding path in a radius of rotation that is smaller than ½ of a spot diameter of the laser (Continued)

light (L); a measuring instrument (14) repeatedly measuring a weld penetration depth of the weld part (35) based on the measurement light (S) that is emitted from the laser emitting head (20) and is reflected on the weld part (35) while the measurement light (S) is being orbitally moved; and a determiner (17) determining the weld penetration depth of the weld part (35) using a plurality of measured values of the weld penetration depth, the plurality of measured values being measured by the measuring instrument (14) within a fixed time period while shifting a start time point of the fixed time period.

3 Claims, 13 Drawing Sheets

(51) Int. Cl.
  *B23K 26/082* (2014.01)
  *B23K 26/21* (2014.01)
  *B23K 31/12* (2006.01)
  *G01B 11/22* (2006.01)
(52) U.S. Cl.
  CPC ............ *B23K 26/082* (2015.10); *B23K 26/21* (2015.10); *B23K 31/125* (2013.01); *G01B 11/22* (2013.01)
(58) Field of Classification Search
  USPC .................................................. 219/121.64
  See application file for complete search history.

(56) References Cited

U.S. PATENT DOCUMENTS

| | | | |
|---|---|---|---|
| 7,804,043 B2* | 9/2010 | Deshi | B23K 26/0624 |
| | | | 219/121.72 |
| 7,989,730 B2* | 8/2011 | Regaard | B23K 26/04 |
| | | | 219/121.63 |
| 9,427,823 B2* | 8/2016 | Alfille | B23K 26/1437 |
| 9,517,533 B2* | 12/2016 | Uchida | G01B 11/30 |
| 10,578,428 B2* | 3/2020 | Strebel | G01B 9/02091 |
| 11,396,062 B2* | 7/2022 | Moser | B23K 31/125 |
| 11,511,370 B2* | 11/2022 | Sakurai | G01B 11/02 |
| 2006/0011592 A1* | 1/2006 | Wang | B23K 26/034 |
| | | | 219/121.64 |
| 2011/0109911 A1* | 5/2011 | Podoleanu | A61B 3/102 |
| | | | 356/451 |
| 2012/0138586 A1* | 6/2012 | Webster | B23K 26/20 |
| | | | 219/121.64 |
| 2012/0285936 A1* | 11/2012 | Urashima | G01B 9/02091 |
| | | | 219/121.63 |
| 2013/0043225 A1* | 2/2013 | Schurmann | B23K 26/044 |
| | | | 219/121.64 |
| 2013/0062324 A1* | 3/2013 | Dorsch | B23K 26/032 |
| | | | 219/121.63 |
| 2013/0068738 A1* | 3/2013 | Schurmann | B23K 26/03 |
| | | | 219/121.72 |
| 2014/0353296 A1* | 12/2014 | Fukuhara | B23K 26/40 |
| | | | 219/121.67 |
| 2016/0039045 A1* | 2/2016 | Webster | G01B 9/02091 |
| | | | 356/450 |
| 2016/0059350 A1* | 3/2016 | Schoenleber | B23K 26/04 |
| | | | 219/121.81 |
| 2016/0193692 A1* | 7/2016 | Regaard | B23K 31/125 |
| | | | 219/121.62 |
| 2016/0202045 A1* | 7/2016 | Schönleber | B23K 26/03 |
| | | | 356/497 |
| 2017/0043431 A1* | 2/2017 | Kuba | B23K 26/032 |
| 2017/0120337 A1* | 5/2017 | Kanko | B33Y 10/00 |
| 2017/0326669 A1* | 11/2017 | Moser | B23K 15/0013 |
| 2018/0126491 A1 | 5/2018 | Nakagawa et al. | |
| 2020/0262004 A1* | 8/2020 | Moser | B01D 1/0017 |

FOREIGN PATENT DOCUMENTS

| | | | | |
|---|---|---|---|---|
| JP | 2016-538134 | 12/2016 | | |
| JP | 2018-501964 | 1/2018 | | |
| WO | 2014/138939 | 9/2014 | | |
| WO | WO-2014138939 A1 * | 9/2014 | ............ | B23K 10/02 |
| WO | WO-2015039741 A1 * | 3/2015 | ............ | B23K 26/03 |
| WO | 2016/194322 | 12/2016 | | |

OTHER PUBLICATIONS

Extended European Search Report dated Apr. 7, 2021 in corresponding European Patent Application No. 19753685.7.
Indian Examination Report dated Jul. 6, 2022 for the related Indian Patent Application No. 202047038674.

* cited by examiner

LASER WELDING DEVICE AND LASER WELDING METHOD

This application is a U.S. national stage application of the PCT International Application No. PCT/JP2019/002613 filed on Jan. 28, 2019, which claims the benefit of foreign priority of Japanese patent application No. 2018-025736 filed on Feb. 16, 2018, the contents all of which are incorporated herein by reference.

TECHNICAL FIELD

The present disclosure relates to a laser welding device and a laser welding method.

BACKGROUND ART

A laser welding device that directly measures a weld penetration depth of a weld part to evaluate the quality of the weld part has been known (see, for example, PTL 1).

PTL 1 discloses a configuration in which laser light and measurement light are coaxially overlapped with each other to irradiate the inside of a keyhole of a weld part and the measurement light reflected on the bottom of the keyhole is caused to enter an optical interferometer via a beam splitter. Because the optical interferometer can measure the optical path length of the measurement light, the depth of the keyhole obtained from the measured optical path length is identified as the weld penetration depth of the weld part.

CITATION LIST

Patent Literature

PTL 1: Japanese Patent Unexamined Publication No. 2012-236196

SUMMARY

Technical Problem

However, it is possible that the depth of the keyhole may not be measured accurately, for example, when the components that retains the beam splitter are displaced because of vibrations or the like and consequently an optical axis misalignment occurs between the laser light and the measurement light.

Specifically, the cross section of the bottom of the keyhole is in a curved shape such that weld penetration is shallower in a front portion in a welding direction. If the optical axis of the measurement light is misaligned frontward in the welding direction relative to the laser light, the measurement light is applied to a curved portion in which the weld penetration is shallower than the deepest part. As a consequence, the measured depth may become shallower than the actual deepest part of the keyhole.

The present disclosure has been made in view of such circumstances, and an object thereof is to measure the weld penetration depth of a weld part more accurately.

Solution to Problem

A laser welding device according to an embodiment of the present disclosure is a laser welding device for welding a weld part with laser light, including: an irradiator overlapping the laser light and a measurement light coaxially with each other and applying the laser light and the measurement light to the weld part, the measurement light having a wavelength different from a wavelength of the laser light; an irradiation position changer changing an irradiation position of the measurement light such that the irradiation position moves on a predetermined welding path, and changing an optical axis position as the irradiation position of the measurement light such that the optical axis position moves within a region having a radius of rotation that is smaller than ½ of a spot diameter of the laser light; a measuring instrument repeatedly measuring a weld penetration depth of the weld part based on the measurement light that is emitted from the irradiator and is reflected on the weld part while the measurement light is moving; and a determiner determining the weld penetration depth of the weld part using a plurality of measured values of the weld penetration depth, the plurality of measured values being measured by the measuring instrument within a fixed time period while shifting a start time point of the fixed time period.

In the laser welding device according to one aspect of the present disclosure, the irradiation position of the measurement light is changed so as to move on a predetermined welding path, and the optical axis position as the irradiation position of the measurement light is changed so as to move within a region having a radius of rotation that is smaller than ½ of the spot diameter of the laser light. Then, the weld penetration depth of the weld part is measured a plurality of times within the fixed time period while the measurement light is moving, and the weld penetration depth is determined using the plurality of measured values while shifting the start time point of the fixed time period.

As a result, even when the optical axis misalignment occurs between the laser light and the measurement light, the weld penetration depth of the weld part can be measured more accurately, and the measurement light is applied more narrowly to an area in which the deepest part of the keyhole exists, so that the deepest part of the keyhole can be probed more efficiently.

It is also possible that the irradiation position changer may change the irradiation position of the measurement light so that the irradiation position orbitally moves around a center of rotation that moves on the predetermined welding path.

It is also possible that, in the orbital movement, the irradiation position changer may change the irradiation position of the measurement light so that the irradiation position moves along a pathway having a spiral shape that revolves around the center of rotation.

In a laser welding device according to one aspect of the present disclosure, the irradiation position of the measurement light is changed so as to move along a pathway having a spiral shape that revolves around the center of rotation. Thus, by setting the frequency of rotation and the radius of rotation appropriately, the measurement light is applied continuously over a wide area to probe the deepest part of the keyhole.

It is also possible that the determiner may determine the weld penetration depth of the weld part based on (i) one or more measured values, or on (ii) an average value of the one or more measured values, where among the plurality of measured values of the weld penetration depth that are measured by the measuring instrument within the fixed time period, the one or more measured values being within a predetermined range with reference to a greatest side measured value of the plurality of measured values.

It is also possible that the predetermined range with reference to the greatest side measured value may be a range of equal to or greater than bottom side 1% to equal to or less than bottom side 20%, when bottom is defined as the greatest side measured value of the weld penetration depth.

In addition, the determiner may further determine whether each of the plurality of measured values of the weld penetration depth is abnormal by comparing each of the plurality of measured values of the weld penetration depth measured by the measuring instrument with a threshold value that is determined based on at least one of an output power intensity of the laser light and a welding speed, the threshold value being a reference of the weld penetration depth.

The laser welding device in one aspect of the present disclosure compares the measured value measured by the measuring instrument with the threshold value that is the reference of the weld penetration depth. Then, if the measured value greatly deviates from the threshold value, it is determined that the measured value is abnormal. This reduces the risk of erroneously identifying an abnormal value that greatly deviates from the threshold value as the measured value of the deepest part of the keyhole.

According to one aspect of the present disclosure, a laser welding method for welding a weld part with laser light is provided, including: an irradiating step of overlapping the laser light and a measurement light having a different wavelength from a wavelength of the laser light coaxially with each other and applying the laser light and the measurement light to the weld part; an irradiation position changing step of changing an irradiation position of the measurement light so as to move on a predetermined welding path, and changing an optical axis position as the irradiation position of the measurement light so as to move within a region having a radius of rotation that is smaller than ½ of a spot diameter of the laser light; a measuring step of repeatedly measuring a weld penetration depth of the weld part based on the measurement light that is reflected on the weld part while the measurement light is moving; and a determining step of determining the weld penetration depth of the weld part using a plurality of measured values of the weld penetration depth, the plurality of measured values being measured in the measuring step within a fixed time period while shifting a start time point of the fixed time period.

In the laser welding method according to one aspect of the present disclosure, the irradiation position of the measurement light is changed so as to move on a predetermined welding path, and the optical axis position as the irradiation position of the measurement light is changed so as to move within a region having a radius of rotation that is smaller than ½ of the spot diameter of the laser light. Then, the weld penetration depth of the weld part is measured a plurality of times within the fixed time period while the measurement light is moving, and the weld penetration depth is determined using the plurality of measured values while shifting the start time point of the fixed time period.

As a result, even when the optical axis misalignment occurs between the laser light and the measurement light, the weld penetration depth of the weld part can be measured more accurately, and the measurement light is applied more narrowly to an area in which the deepest part of the keyhole exists, so that the deepest part of the keyhole can be probed more efficiently.

It is also possible that, in the irradiation position changing step, an irradiation position of the measurement light may be moved together with the laser light, or the irradiation position of the measurement light may be relatively moved relative to the laser light, when the irradiation positions of the laser light and the measurement light are both to be moved in a spiral shape.

It is also possible that, in the irradiation position changing step, the irradiation position of the laser light is moved in a linear shape and the irradiation position of the measurement light is moved so as to form a circular shape or a polygonal shape including a triangular shape and a quadrangular shape, when the irradiation position of the measurement light is to be relatively moved relative to the laser light.

Advantageous Effects of Invention

The present disclosure makes it possible to measure the weld penetration depth of a weld part more accurately.

DESCRIPTION OF EMBODIMENTS

Hereinbelow, exemplary embodiments of the present disclosure are described with reference to the drawings. It should be noted, however, that the following exemplary embodiments are merely illustrative and not intended to limit the present disclosure, applications thereof, and uses thereof.

Figure 1:
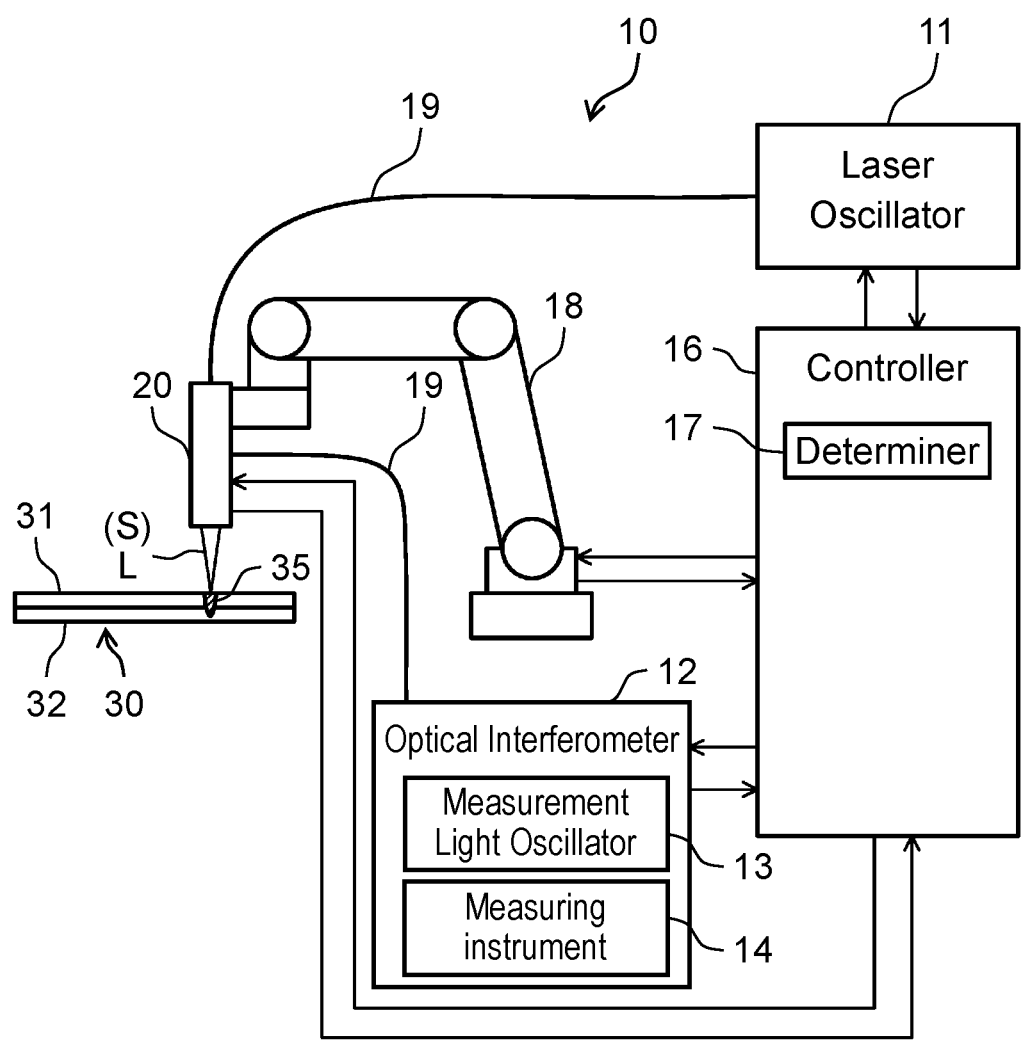
FIG. 1 is a schematic view of a laser welding device according to an exemplary embodiment.

FIG. 1 is a schematic view of laser welding device 10 according to an exemplary embodiment.

As illustrated in FIG. 1, laser welding device 10 includes laser oscillator 11, optical interferometer 12, laser emitting head 20 (irradiator), robot 18, and controller 16. Laser oscillator 11 outputs laser light L. Optical interferometer 12 outputs measurement light S. Laser emitting head 20 emits laser light L and measurement light S toward welding target object 30. Laser emitting head 20 is mounted on robot 18 so that robot 18 can move laser emitting head 20. Controller 16 controls laser oscillator 11, optical interferometer 12, laser emitting head 20, and robot 18, to perform laser welding.

Laser oscillator 11 outputs laser light L based on a command from controller 16. Laser oscillator 11 and laser emitting head 20 are connected by optical fiber 19. Laser light L is transmitted from laser oscillator 11 to laser emitting head 20 via optical fiber 19.

Optical interferometer 12 includes measurement light oscillator 13 that outputs measurement light S having a different wavelength from the wavelength of laser light L, and measuring instrument 14 that measures a weld penetration depth of later-described weld part 35. Measurement light oscillator 13 outputs measurement light S based on a command from controller 16. Optical interferometer 12 and laser emitting head 20 are connected by optical fiber 19. Measurement light S is transmitted from optical interferometer 12 to laser emitting head 20 via optical fiber 19.

Laser emitting head 20 is mounted to an end portion of an arm of robot 18. Laser emitting head 20 focuses laser light L and measurement light S onto welding target object 30 based on a command from controller 16.

Based on a command from controller 16, robot 18 moves laser emitting head 20 to a designated position for scanning of laser light L and measurement light S.

Controller 16 is connected to laser oscillator 11, optical interferometer 12, robot 18, and laser emitting head 20. Controller 16 has the function of controlling the moving speed of laser emitting head 20, in addition to controlling start and stop of outputting laser light L, the output power intensity of laser oscillator 11, and the like. Although the details will be described later, controller 16 includes determiner 17 that determines the weld penetration depth of weld part 35 using a plurality of measured values that are measured by measuring instrument 14.

Welding target object 30 includes upper metal plate 31 and lower metal plate 32, which are overlapped one on top of the other. Laser welding device 10 irradiates the upper surface of upper metal plate 31 with laser light L to weld upper metal plate 31 and lower metal plate 32 together.

Here, laser welding device 10 according to the present exemplary embodiment is able to carry out measurement of a weld penetration depth of weld part 35 simultaneously with the laser welding. Specific details are described below with reference to FIG. 2.

Figure 2:
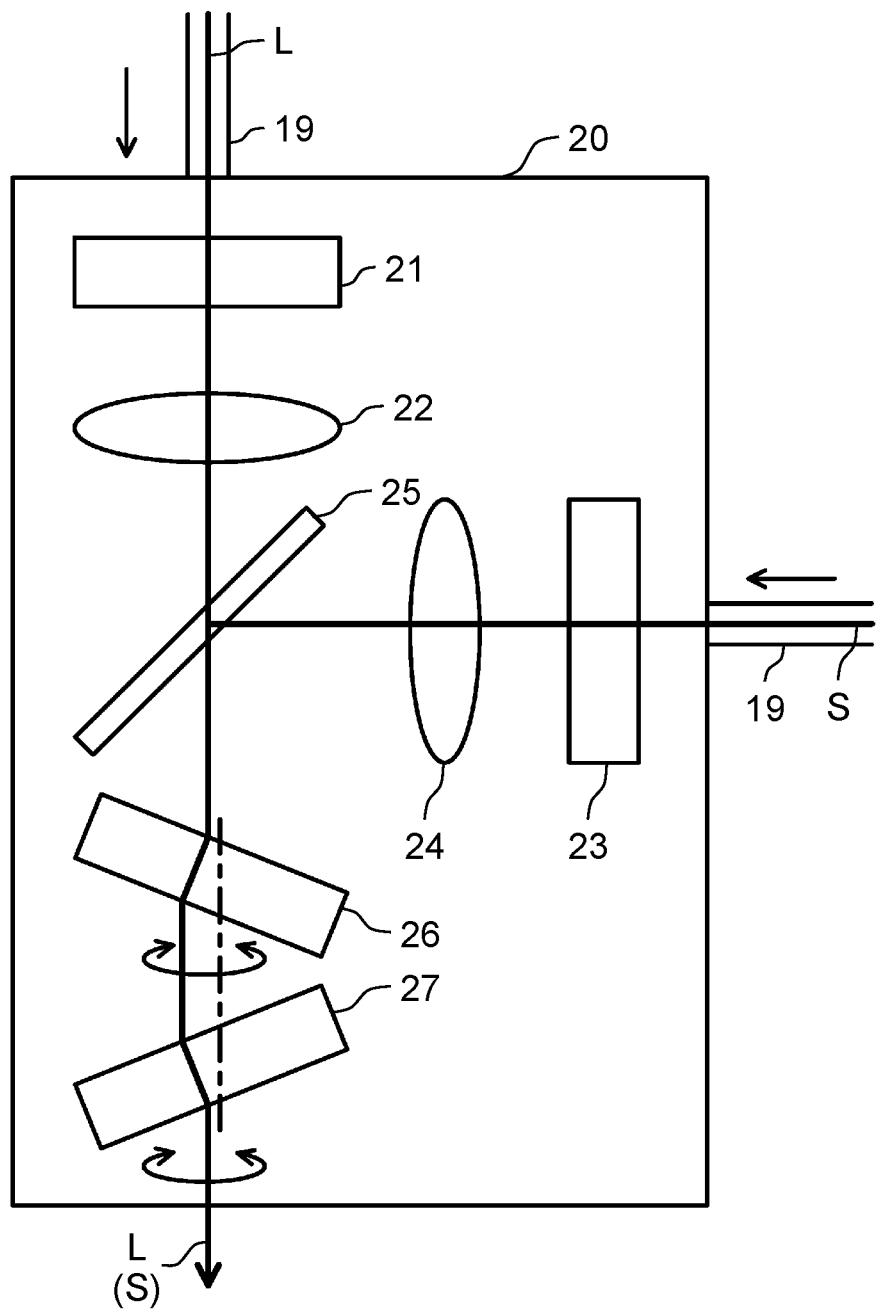
FIG. 2 is a schematic view illustrating the configuration of a laser emitting head.

FIG. 2 is a schematic view illustrating the configuration of laser emitting head 20.

As illustrated in FIG. 2, laser emitting head 20 includes first collimating lens 21, first focusing lens 22, second collimating lens 23, second focusing lens 24, beam splitter 25, first parallel plane plate 26, and second parallel plane plate 27. Laser light L passes through first collimating lens 21 and first focusing lens 22. Measurement light S passes through second collimating lens 23 and second focusing lens 24. Beam splitter 25 combines laser light L and measurement light S into a coaxial light bundle.

Beam splitter 25 is a dichroic mirror whose transmitting and reflecting wavelengths are set such that it can transmit laser light L from laser oscillator 11 and reflect measurement light S from optical interferometer 12.

In this case, in order to sufficiently separate laser light L and measurement light S with beam splitter 25, it is desirable that the wavelength difference between laser light L and measurement light S be set to equal to or greater than 100 nm.

First parallel plane plate 26 and second parallel plane plate 27 are connected to a motor, not shown the drawings, and are rotated according to a command from controller 16.

Laser light L that is output from laser oscillator 11 is sent to laser emitting head 20 through optical fiber 19. Laser light L that has entered laser emitting head 20 is collimated by first collimating lens 21 and is focused by first focusing lens 22. Laser light L that has been focused by first focusing lens 22 transmits through beam splitter 25.

On the other hand, measurement light S that is output from optical interferometer 12 is sent to laser emitting head 20 through optical fiber 19. Measurement light S that has entered laser emitting head 20 is collimated by second collimating lens 23 and is focused by second focusing lens 24. Thereafter, measurement light S is overlapped concentrically and coaxially with laser light L by beam splitter 25.

Note that second focusing lens 24 also has the function of causing measurement light S reflected from weld part 35 to enter optical interferometer 12 again through beam splitter 25.

Then, laser light L and measurement light S that have been overlapped coaxially with each other pass through first parallel plane plate 26 and second parallel plane plate 27, which are controlled by controller 16. Thereby, irradiation positions (focal lengths) of laser light L and measurement light S are determined, and laser light L and measurement light S are applied to weld part 35 of welding target object 30.

At that time, laser emitting head 20 is able to rotate and orbitally move laser light L and measurement light S to form a circular orbit by rotating first parallel plane plate 26 and second parallel plane plate 27. In other words, first parallel plane plate 26 and second parallel plane plate 27 constitute an irradiation position changer that is capable of changing irradiation positions of laser light L and measurement light S.

It is also possible to move the irradiation positions of laser light L and measurement light S within a weld region in welding target object 30 by moving laser emitting head 20 by means of robot 18.

Figure 3:
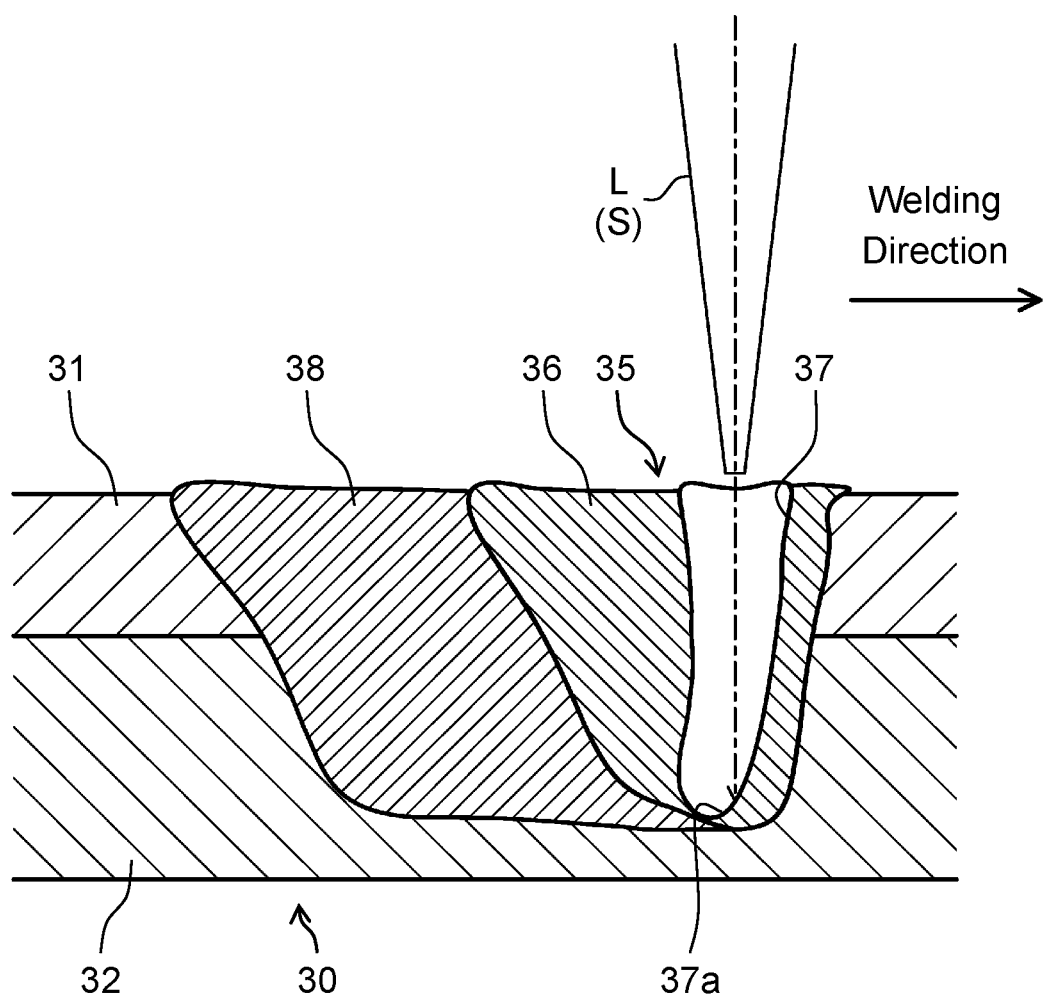
FIG. 3 is a side cross-sectional view illustrating the positional relationship between laser light, measurement light, and keyhole.

FIG. 3 is a side cross-sectional view illustrating the positional relationship between laser light L, measurement light S, and keyhole 37.

As illustrated in FIG. 3, when welding weld part 35 of welding target object 30, which includes upper metal plate 31 and lower metal plate 32, laser welding device 10 applies laser light L to the upper surface of upper metal plate 31 from above welding target object 30.

Weld part 35 irradiated with laser light L is melted from its top portion, and weld pool 36 is formed in weld part 35. When weld part 35 melts, molten metal evaporates from weld pool 36, and the vapor pressure that is generated during the evaporation forms keyhole 37. Herein, weld pool 36 and keyhole 37 are together treated as weld part 35. Weld pool 36 is solidified at the rear of weld pool 36 in the welding direction, and thereby solidified portion 38 is formed.

At that time, measurement light S emitted from optical interferometer 12 is overlapped by beam splitter 25 concentrically and coaxially with laser light L emitted from laser oscillator 11, and is applied to the inside of keyhole 37. The applied measurement light S reflects at bottom part 37a of keyhole 37, passes through beam splitter 25, and enters optical interferometer 12.

The optical path length of measurement light S that has entered optical interferometer 12 is measured by measuring instrument 14. Measuring instrument 14 identifies the depth of keyhole 37, obtained from the measured optical path length, as the weld penetration depth (i.e., the measured value) of weld part 35. Laser welding device 10 judges the quality of weld part 35 based on the measured weld penetration depth.

With the configuration as described above, laser welding device 10 can serve the function of measuring weld penetration depth and the function of laser welding at the same time.

It is possible that, in some cases, the components that retain beam splitter 25 may undergo dislocation because of vibrations, for example, which can cause an optical axis misalignment between laser light L and measurement light S. When the optical axis misalignment occurs between laser light L and measurement light S, optical interferometer 12 may erroneously determine the depth of keyhole 37 to be shallower than the actual depth and may be unable to measure the weld penetration depth accurately.

The details are as follows. Keyhole 37 is formed by the vapor pressure that is generated when the metal melted in weld part 35 and is evaporated therefrom. The shape of formed keyhole 37 varies depending on the irradiation time of laser light L and the condition of weld pool 36.

Here, an inner wall portion of keyhole 37 that is frontward in the welding direction tends to be formed in such a shape as to be more curved toward the rear of keyhole 37 as the moving speed (i.e., welding speed) of laser emitting head 20 increases. For this reason, in order to reduce the curvature of the curved portion of bottom part 37a of keyhole 37, it is desirable to set the laser welding speed appropriately.

However, even when the laser welding speed is set appropriately, it is difficult to make the aperture diameter of keyhole 37 and the hole diameter of bottom part 37a substantially equal to each other, so a curved shape with a shallow weld penetration forms in the inner wall portion of keyhole 37 that is frontward in the welding direction.

Note that the aperture diameter of keyhole 37 is substantially equal to the spot diameter of laser light L, which is the processing light.

The spot diameter of laser light L and the spot diameter of measurement light S are defined by the size of the spot light at the focal point at which they are focused on the surface of welding target object 30.

Figure 4:
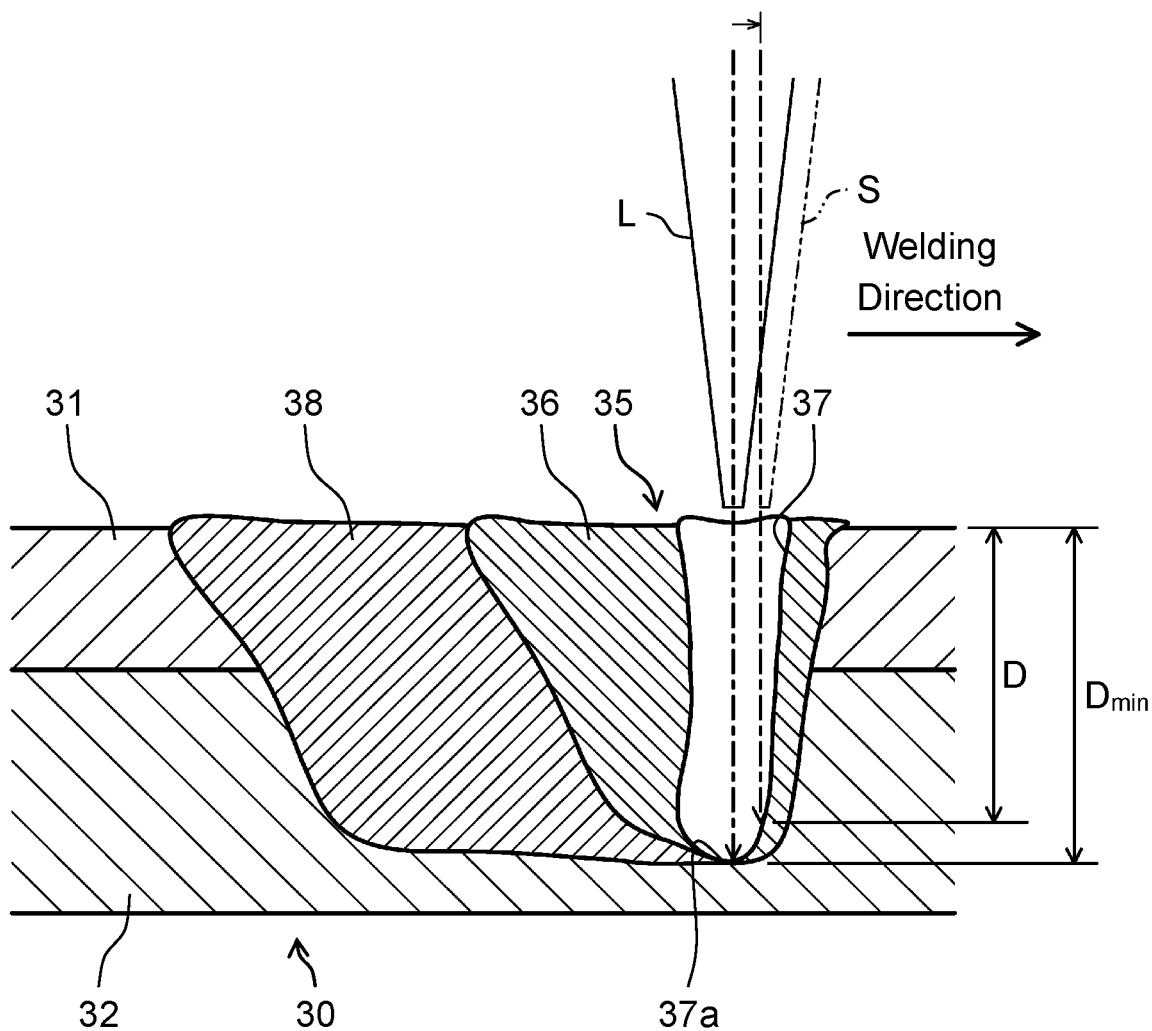
FIG. 4 is a side cross-sectional view illustrating the positional relationship between laser light, measurement light, and keyhole, when an optical axis misalignment of the measurement light occurs.

Accordingly, as indicated by the imaginary line in FIG. 4, when the optical axis of measurement light S applied coaxially with the optical axis of laser light L is misaligned frontward, for example, in the welding direction relative to laser light L within the region inside the spot diameter of laser light L, the position of bottom part 37a of keyhole 37 does not match the center position of the spot of measurement light S. As a consequence, measurement light S may not reach bottom part 37a.

Note that FIG. 3 shows the state in which the two optical axes, the optical axis of laser light L and the optical axis of measurement light S applied coaxially therewith, are in agreement each other, and not misaligned.

An example of the state in which measurement light S does not reach bottom part 37a is as follows. In the case in which measurement light S is misaligned frontward in the welding direction relative to laser light L, more specifically, in the case in which the optical axis of measurement light S is misaligned frontward in the welding direction relative to the optical axis of laser light L within a region of the spot diameter of laser light L, measurement light S is applied to the inner wall portion on the front side of keyhole 37. Under this condition, optical interferometer 12 recognizes the position at which measurement light S is reflected as the position of bottom part 37a, and measures the depth of keyhole 37 accordingly.

That is, if measurement light S does not reach bottom part 37a, optical interferometer 12 measures the depth of keyhole 37 to be shallower than the actual depth. In other words, when the optical axis of measurement light S is misaligned frontward in the welding direction relative to the laser light L, measurement light S is not applied to the deepest part of the keyhole 37 of weld part 35, but is applied to a portion in which the weld penetration is shallower than the deepest part. Consequently, the measured depth becomes shallower than the actual depth of the deepest part of keyhole 37.

In the example shown in FIG. 4, depth D, which is shallower than actual depth Dmin of keyhole 37, is measured. Thus, from the depth of keyhole 37 that is measured to be shallower than the actual depth, testing of weld part 35 cannot be carried out accurately.

Here, in order to prevent optical interferometer 12 from measuring the depth of keyhole 37 to be shallower than the actual depth, it is necessary to apply measurement light S precisely to bottom part 37a. In view of this, a configuration for applying measurement light S precisely to bottom part 37a will be described below.

Figure 5:
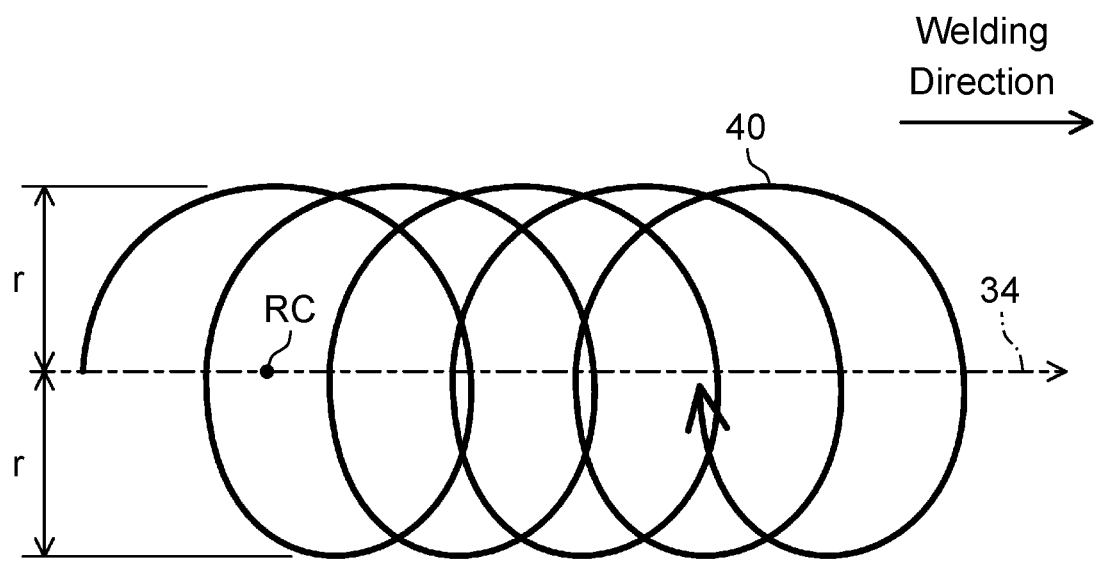
FIG. 5 is a view illustrating a pathway of the irradiation position of measurement light.

As illustrated in FIG. 5, laser welding device 10 applies laser light L and measurement light S to welding target object 30 along spin pathway 40, in which the beam spot is relatively moved in the welding direction while applying laser light L and measurement light S in a spiral shape, to weld welding target object 30.

Spin pathway 40 refers to a pathway of laser light L and measurement light S in which a spot resulting from the applied laser light L and measurement light S is moved in the welding direction while being moved along a circular pathway. In other words, spin pathway 40 is such a pathway that the locus of laser light L and measurement light S is relatively moved linearly in the welding direction while rotating the locus of laser light L and measurement light S.

The irradiation positions of laser light L and measurement light S orbitally move such as to be spaced by the radius of rotation r from the center of rotation RC that moves on welding path 34, so as to revolve around the center of rotation RC at a predetermined rotational frequency. That is, the irradiation positions of laser light L and measurement light S relatively move relative to welding target object 30 along spin pathway 40 having a spiral shape.

Here, laser emitting head 20 changes the irradiation position of measurement light S so as to move the irradiation position in a radius of rotation r that is smaller than the spot diameter of laser light L. Note that the radius of rotation represents the radius of pathway when a rotational movement is assumed to take place. The aperture diameter of keyhole 37 is substantially equal to the spot diameter of laser light L, which is the processing light. Therefore, it is preferable that the radius of rotation r of measurement light S be set to be smaller than ½ of the spot diameter of laser light L, more preferably, in the range from 1/20 to less than ½, still more preferably, from 1/16 to ⅛, inclusive, of the spot diameter of laser light L, so that the optical axis position of measurement light S overlaps the irradiation position of measurement light S within a region of the spot diameter of laser light L. For example, when the spot diameter of laser light L is 800 µm, the radius of rotation r of measurement light S should preferably be set to be in the range of from approximately 50 µm to approximately 100 µm. This makes it possible to apply measurement light S with higher quality only to the area containing the deepest part of keyhole 37, which has been formed by laser light L, within a region of the spot diameter.

It should be noted that the spot diameter of laser light S is from approximately 100 µm to approximately 150 µm.

Although the spot diameter of laser light L is set to 800 µm, the spot diameter may also be from 600 µm to 900 µm.

It is sufficient that the radius of rotation r should be a radius such as to overlap the spot diameter of laser light L. Therefore, it is preferable that the irradiation position of measurement light S be changed so as to move in a radius of rotation that is less than ½ of the spot diameter of laser light L so that the irradiation position of measurement light S can move within an orbiting area that is smaller than the radius of the spot diameter of laser light L so as to overlap the irradiation position of measurement light S with the region of the spot diameter of laser light L. In other words, it is preferable that the irradiation position of measurement light S be changed in such a manner that the irradiation position moves on a predetermined welding path and that the optical axis position as the irradiation position of measurement light S moves within a region having a radius of rotation that is smaller than ½ of the spot diameter of laser light L.

For example, when the spot diameter of laser light L is 800 µm, it is possible that the rotational frequency of measurement light S may be set to 40 Hz and the radius of rotation r may be set to less than 400 µm.

If the irradiation position of measurement light S is changed so as to orbitally move greatly in a radius of rotation that is greater than the radius of the spot diameter of laser light L, measurement light S is less likely to be applied to the region inside the keyhole aperture and to the area in which the deepest part of keyhole 37 formed by laser light L within the region inside the keyhole aperture. Consequently, the weld penetration depth data, which represent the depth of the keyhole, fluctuate greatly, because both deeper data and shallower data are detected as the irradiation position undergoes the orbital movement, making it more difficult to accurately measure the weld penetration depth.

Thus, it is possible to probe bottom part 37a of keyhole 37 while applying measurement light S to welding target object 30 along the spiral pathway in which the center of rotation RC moves on welding path 34.

When measurement light S is applied to keyhole 37 while orbitally moving the irradiation positions of laser light L and measurement light S in a spiral shape as described above, measurement light S can be applied almost certainly to bottom part 37a. As a result, even when the center of the spot of measurement light S does not match bottom part 37a, it becomes possible to apply measurement light S to bottom part 37a.

The following describes how the measured values of the weld penetration depth of weld part 35, that is, the depth of keyhole 37, vary between when measurement light S is orbitally moved along spin pathway 40 and when measurement light S is not orbitally moved along spin pathway 40.

In the example shown in FIG. 4, it is assumed that the plate thickness of upper metal plate 31 is 1 mm, the plate thickness of lower metal plate 32 is 4.3 mm, and the optical axis of measurement light S is misaligned 100 µm frontward in the welding direction relative to the optical axis of laser light L.

Figure 6:
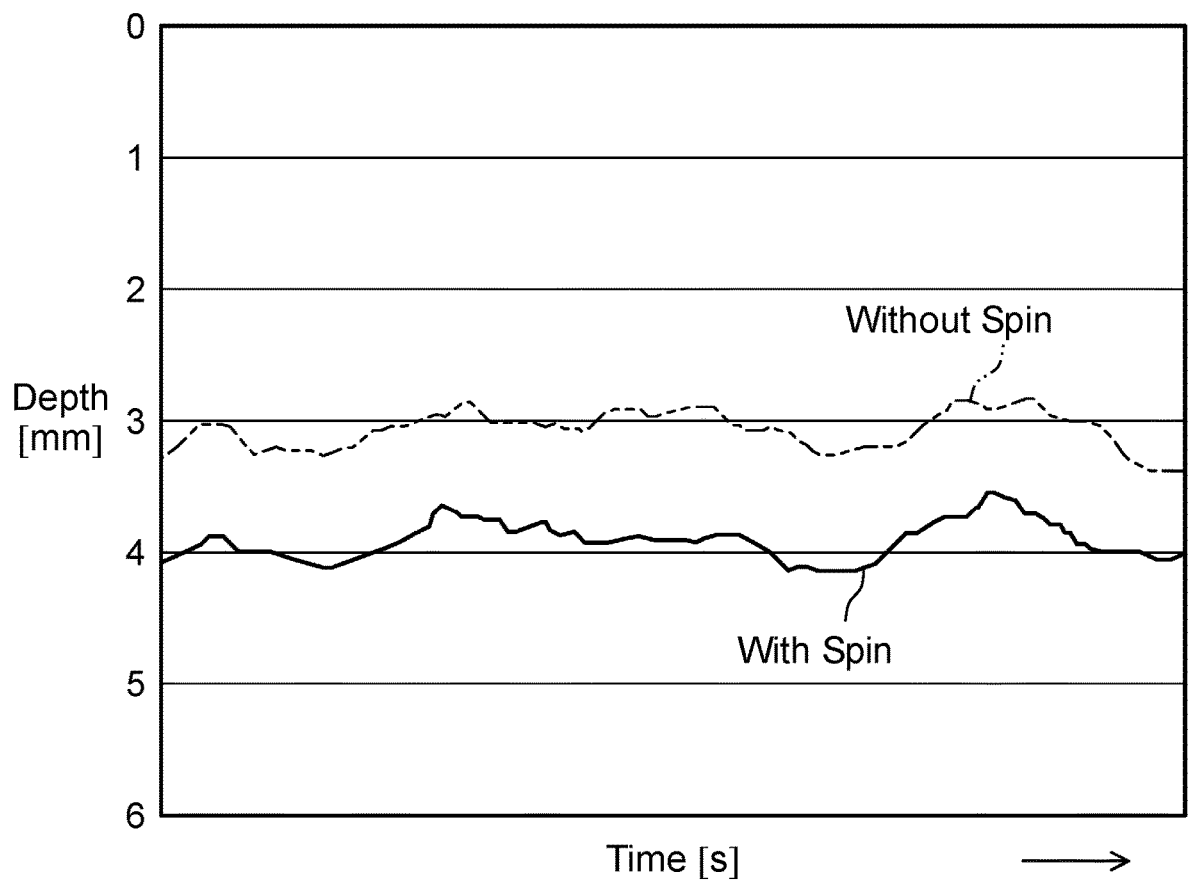
FIG. 6 is a graph comparing measurement results of weld penetration depth between the case where measurement light is orbitally moved and the case where measurement light is not orbitally moved, when the optical axis misalignment occurs.

FIG. 6 shows a graph obtained when the depth of keyhole 37 as the weld penetration depth of weld part 35 is measured from a surface of welding target object 30 or an imaginary plane serving as the reference. As illustrated in FIG. 6, when measurement light S is not orbitally moved along spin pathway 40, the measured value of the depth of keyhole 37 fluctuates in the vicinity of 3 mm. On the other hand, when measurement light S is orbitally moved along spin pathway 40, the measured value of the depth of keyhole 37 fluctuates in the vicinity of 4 mm.

This indicates that the measured value of keyhole 37 is greater, in other words, bottom part 37a of keyhole 37 can be probed to a deeper position, when measurement light S is orbitally moved along spin pathway 40 than when measurement light S is not orbitally moved along spin pathway 40. Note that the measured value graph of FIG. 6 shows moving average values (hereinafter also simply referred to as "average values") calculated for every interval SA (sampling area), which is a predetermined fixed time period, by sampling measured values in the bottom several percent of the measured values obtained by a plurality of times of measurement during the orbital movement of measurement light S.

Note that the phrase "sampling the measured values in the bottom several percent" means that the weld penetration depth of weld part 35 is measured a plurality of times to sample the measured values in the bottom several percent range from the deepest side, when the greatest side measured value in the measured values of the weld penetration depth is defined as the bottom side.

Here, the average values of the sampled measured values in the bottom several percent were compared with the actual depths that were obtained in advance by experiments or the like, and it was found that they are substantially in agreement with each other. Accordingly, the weld penetration depth is determined based on a plurality of measured values.

Figure 7:
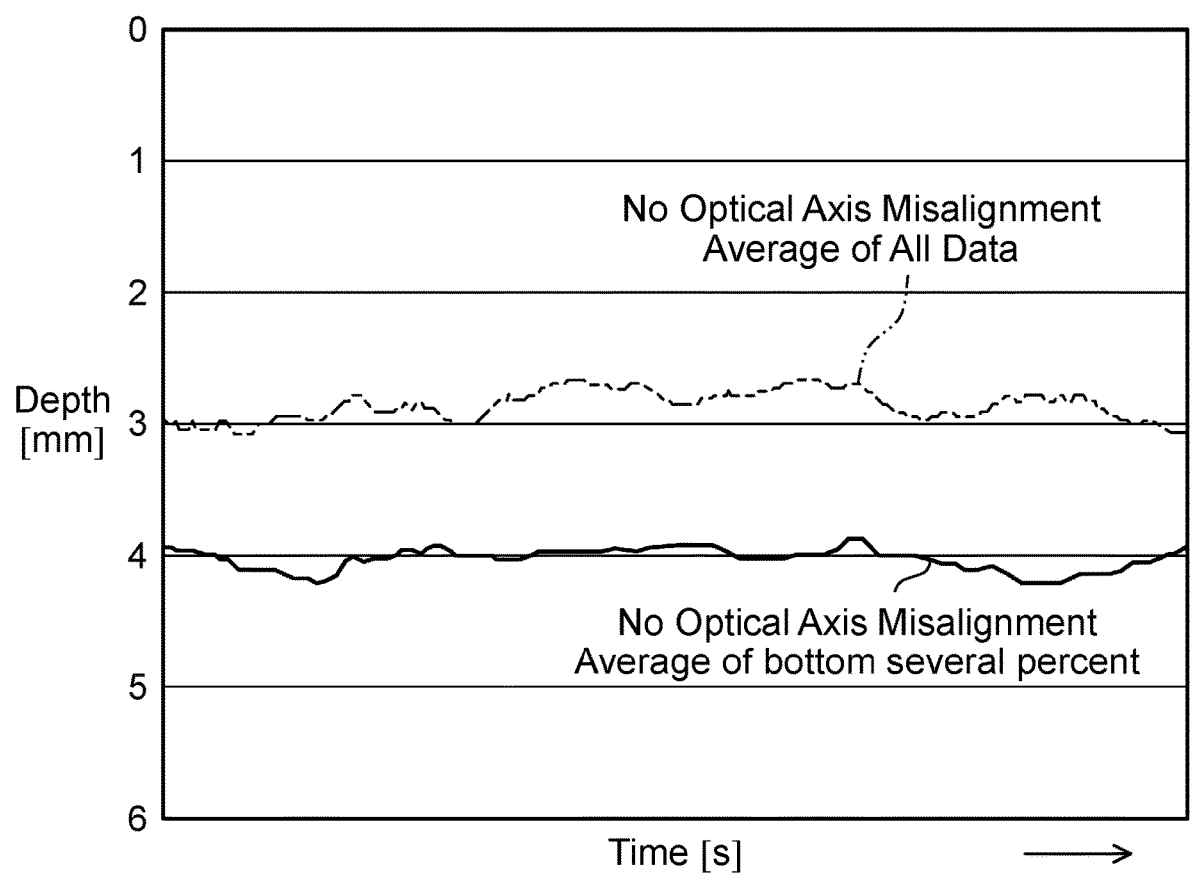
FIG. 7 is a graph comparing the average value of all the data of measured values obtained by a plurality of times of measurement and the average value of sampled measured values in the bottom several percent, in the case where no optical axis misalignment occurs.

FIG. 7 is a graph comparing an average value of all the measured value data obtained by a plurality of times of measurement and an average value of sampled measured values in the bottom several percent, in the case where an optical axis misalignment does not occur.

As illustrated in FIG. 7, in the case where the average value is calculated using all the data of the plurality of measured values, the measured value of the depth of keyhole 37 fluctuates in the vicinity of 3 mm. On the other hand, in the case where the average value is calculated from a plurality of measured values within a predetermined range with reference to the greatest side measured value in the plurality of measured values, the measured value of the depth of keyhole 37 fluctuates in the vicinity of 4 mm.

Herein, the phrase "measured values within a predetermined range with reference to the greatest side measured value in the plurality of measured values, which represents the actual depth of the deepest part," means the measured values within a bottom several percent range when bottom side is defined as the greatest side measured value of the weld penetration depth.

This indicates that the measured value of keyhole 37 is greater, in other words, bottom part 37a of keyhole 37 can be probed to a deeper position, when the average value is calculated using the measured values in the bottom several percent of the plurality of measured values than when the average value is calculated using all the data of the plurality of measured values.

In addition, the term "measured values in the bottom several percent" means measured values in a several percent range from the greatest side measured value, which is synonymous with measured values of several percent on the deepest side.

Those measured values indicating shallower depths of keyhole 37 are excluded from the plurality of measured values in order to remove fluctuated values, which indicate shallower measurements of keyhole 37 because of the conditions of keyhole 37 in weld pool 36 and external disturbances such as noises, vibrations, and fumes, and to thereby more accurately identify the weld penetration depth of weld part 35.

In other words, among the measured depth values of keyhole 37 measured by measurement light S applied coaxially with laser light L, deeper values are unlikely to be obtained unless the actual depth is deep. On the other hand, shallower depth values should be removed because irregular values may sometimes be obtained in cases where measurement light is erroneously reflected because of diffused reflection in the middle of the depth of keyhole 37 or the like due to the conditions of keyhole 37 in weld pool 36 (such as collapse of keyhole 37 or lapping of molten metal) or external disturbances (such as noises, vibrations, or fumes). Such shallower values should be removed.

Note that the bottom several percent range is preferably from equal to or greater than bottom side 1% to equal to or less than bottom side 20%. The reason is that, if less than 1% values are included, singular point values that indicate deeper values may be included locally, and consequently, the obtained depth of keyhole 37 may result in a deeper value than the actual value (i.e., the moving average value of actual depths indicating the depth of the actual deepest part).

On the other hand, if greater than 20% values are included, the depth of keyhole 37 tends to be shallower than the actual value because irregular values affected by the conditions of keyhole 37 and external disturbance are included and the portions on spin pathway 40 that show shallower measured values are included.

More preferably, the bottom several percent range is from equal to or greater than bottom side 3% to equal to or less than bottom side 7%, and in the range of approximately bottom side 5%. This reduces variations between the plurality of measured values, and makes it possible to accurately measure the weld penetration depth of weld part 35.

Herein, the average value may be simply an average value of a plurality of values, but more preferably, it is desirable to employ a moving average value obtained by setting predetermined fixed time periods and, for each predetermined fixed time period, continuously calculating average value within a respective fixed time period.

Figure 8:
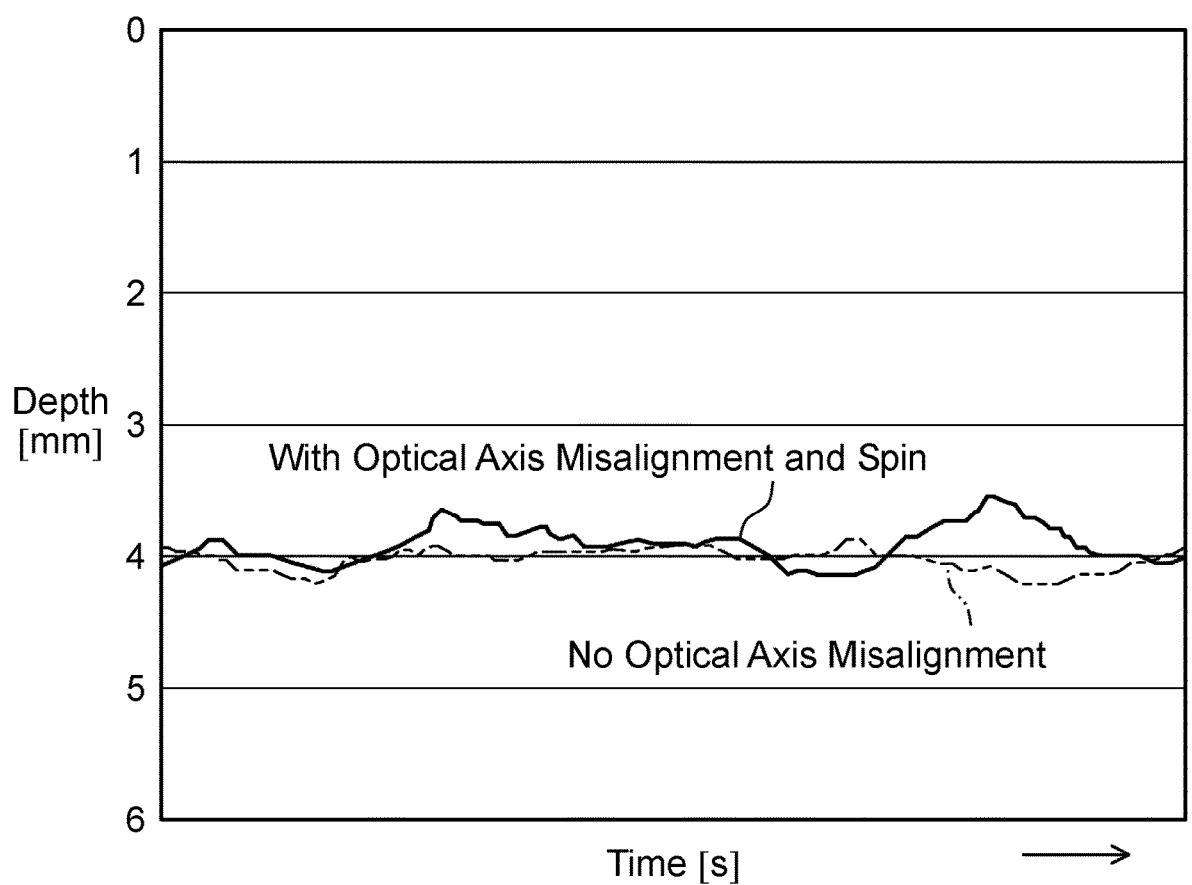
FIG. 8 is a graph comparing measurement results of weld penetration depth between the case where no optical axis misalignment occurs and the case where the optical axis misalignment occurs and measurement light is orbitally moved.

FIG. 8 is a graph comparing measured values of the weld penetration depth of weld part 35, that is, the depth of keyhole 37, between when an optical axis misalignment does not occur and when the optical axis misalignment occurs and measurement light S is orbitally moved along spin pathway 40. Note that either of the measurement results uses the average value of sampled measured values in the bottom several percent.

As illustrated in FIG. 8, when the optical axis misalignment does not occur, the measured value of the depth of keyhole 37 fluctuates in the vicinity of 4 mm. On the other hand, when measurement light S is orbitally moved along spin pathway 40, the measured value of the depth of keyhole 37 similarly fluctuates in the vicinity of 4 mm. This demonstrates that, when measurement light S is orbitally moved along spin pathway 40, the depth of bottom part 37a of keyhole 37 can be probed to substantially the same depth as that is probed when the optical axis misalignment does not occur.

Hereinbelow, an operation of measuring the weld penetration depth of weld part 35 will be described.

Figure 9:
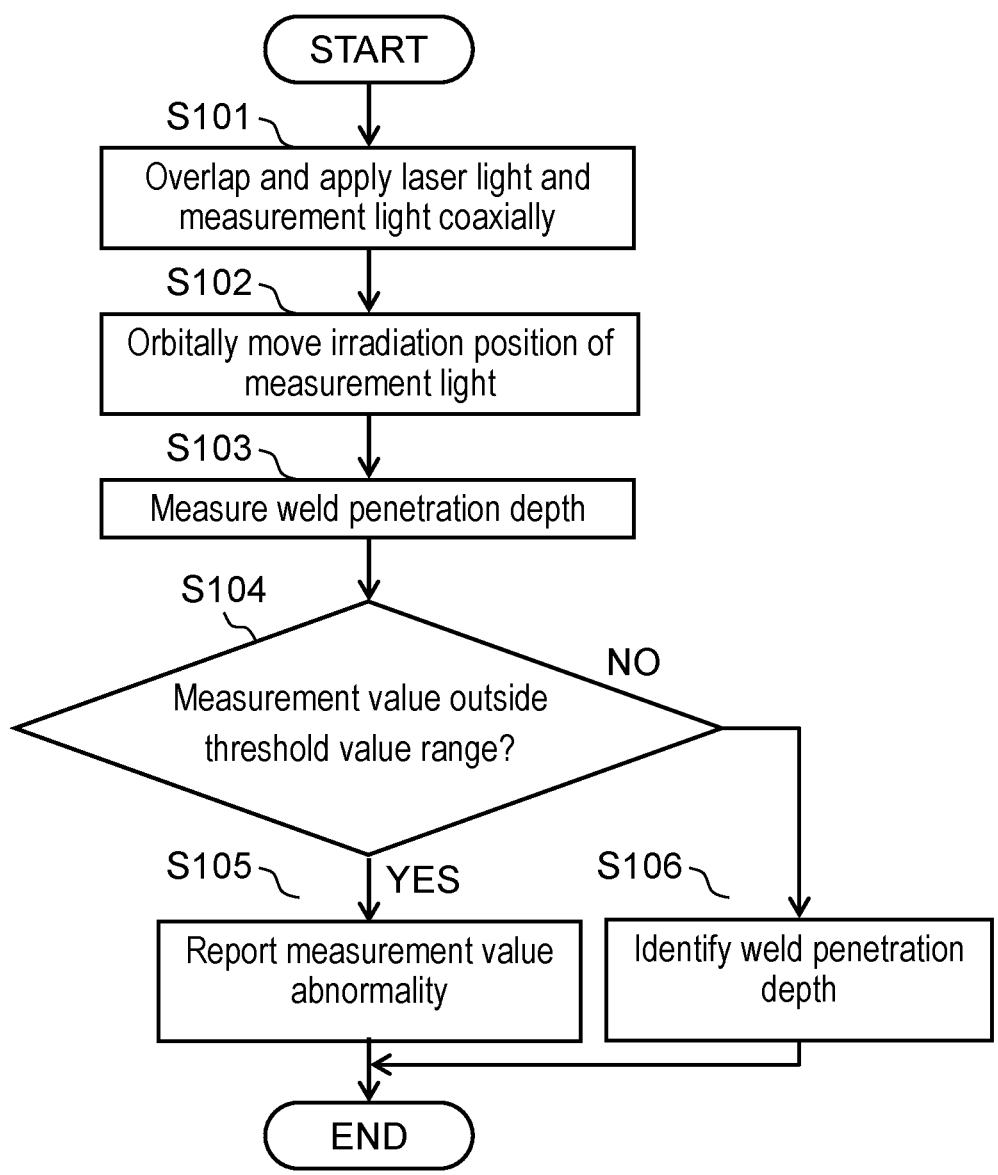
FIG. 9 is a flowchart illustrating an operation of measuring a weld penetration depth of a weld part.

FIG. 9 is a flowchart illustrating the operation of measuring the weld penetration depth of weld part 35.

As illustrated in FIG. 9, in step S101, first, laser emitting head 20 coaxially overlaps laser light L and measurement light S and starts irradiating weld part 35, and the process proceeds to step S102.

In step S102, the orbital movement of irradiation positions of laser light L and measurement light S is started, and the process proceeds to step S103. The orbital movement is performed such that the irradiation positions of laser light L and measurement light S are changed so as to orbitally move in a spiral shape around the center of rotation RC that moves on welding path 34.

In step S103, measuring instrument 14 starts measuring the weld penetration depth of weld part 35 based on measurement light S that is reflected at weld part 35, and the process proceeds to step S104. In other words, the process of step S103 allows measuring instrument 14 to repeatedly measure the weld penetration depth of weld part 35.

When welding is completed, the processes started at steps S101 to S103 are ended, and in step S104, determiner 17 determines whether all the measured values of the weld penetration depth that have been measured during the orbital movement of measurement light S are outside a predetermined threshold value range (that is, less than a predetermined threshold value). If the determination in step S104 is "YES", it is judged that the measured value is abnormal, and the process branches to step S105. If the determination in step S104 is "NO", the process branches to step S106.

Here, the predetermined threshold value is a threshold value that serves as the reference of the weld penetration depth that is determined in advance based on, for example, the output power intensity of laser light L and the welding speed. In other words, the predetermined threshold value is a depth value of keyhole 37 as the weld penetration depth depending on the output power intensity of laser light L and the welding speed. Such predetermined threshold values are stored in a table in determiner 17.

When the measured value is outside the threshold value range, in other words, when the measured value greatly deviates from the threshold value, it is judged that the weld penetration depth has not been measured accurately. This reduces the risk of erroneously identifying an abnormal value that greatly deviates from the threshold value as the measured value of the deepest part of keyhole 37.

In step S105, the abnormality is reported to the user by, for example, displaying a message that warns about the abnormality of measured value on a display monitor, not shown in the drawings, and the process of measuring the weld penetration depth of weld part 35 is ended.

On the other hand, in step S106, determiner 17 identifies the weld penetration depth of weld part 35 using the plurality of measured values that are measured by measuring instrument 14, and the process of measuring the weld penetration depth of weld part 35 is ended. For example, measured values in the bottom several percent are sampled from the plurality of measured values, and the average value thereof, specifically, the average value within the interval SA, which is a predetermined fixed time period, is continuously calculated, to determine the weld penetration depth. Note that it is also possible that the measured values that indicate a shallower depth of keyhole 37 may be excluded to sample the measured values in the bottom several percent that indicate a greater depth of keyhole 37 than a predetermined threshold value, and the average value of the sampled measured values may be calculated, to determine the weld penetration depth. This reduces variations between the plurality of measured values, and makes it possible to accurately measure the weld penetration depth of weld part 35.

The weld penetration depth of weld part 35 that is at a rearward position in the welding direction relative to the irradiation position of laser light L is measured a plurality of times during the orbital movement of measurement light S, and the weld penetration depth is determined based on the plurality of measured values. This makes it possible to identify the depth of the deepest part of keyhole 37 more accurately.

Specifically, the measured depth of keyhole 37 tends to be shallower than the actual depth at a position frontward relative to the irradiation position of laser light L in the welding direction. On the other hand, when the weld penetration depth of weld part 35 is measured at a position rearward relative to the irradiation position of laser light L in the welding direction, it is possible to reduce the risk of causing the depth to be measured shallower than the actual depth of weld part 35.

If variations are not so great between the plurality of measured values, the greatest value of the plurality of measured values or the average value of the plurality of measured values may be determined to be the weld penetration depth of weld part 35.

As described above, the weld penetration depth is measured while orbitally moving the irradiation position of measurement light S and changing the optical axis position that is the irradiation position of measurement light S so as to move within a region having a radius of rotation r that is smaller than ½ of the spot diameter of laser light L. This allows the deepest part of keyhole 37 to be probed so as to be irradiated with measurement light S, reducing the adverse effect resulting from the optical axis misalignment between laser light L and measurement light S. Furthermore, it is possible to determine the greatest value of a plurality of measured values measured in a predetermined time period, the average value of the plurality of measured values, the average value of the values in the bottom several percent range of the plurality of measured values, or the like, as the weld penetration depth of the deepest part.

Other Exemplary Embodiments

The foregoing exemplary embodiment may also be configured as follows.

Figure 10:
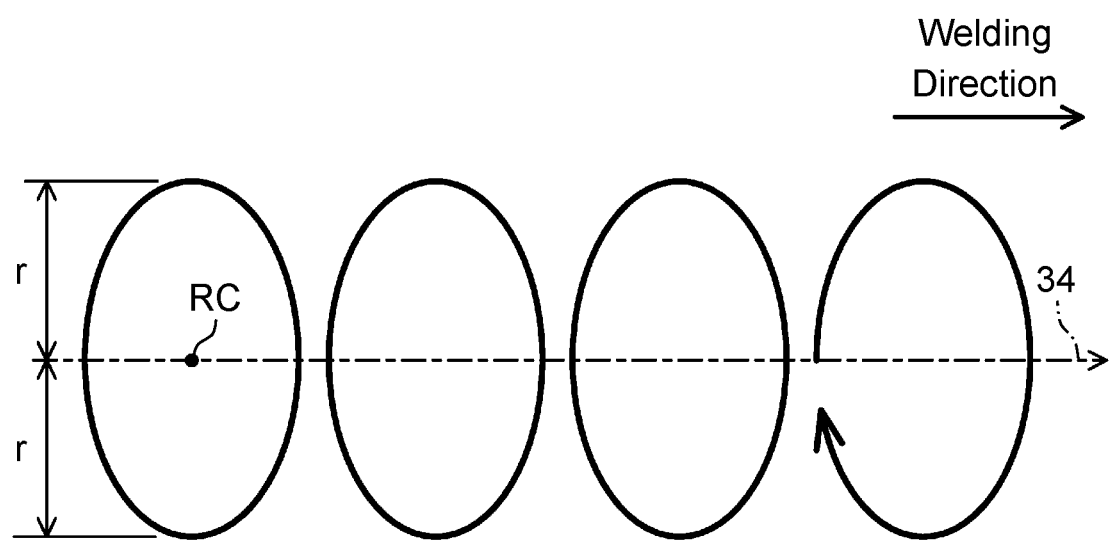
FIG. 10 is a view illustrating another pathway of the irradiation position of the measurement light.

In the present exemplary embodiment, spin pathway 40 may be not only in a simple spiral shape but also in other shapes such as a circular shape or a polygonal shape such as a quadrangular shape. Alternatively, as illustrated in FIG. 10, it is also possible that the pathway may be such that elliptic pathways are formed discontinuously. That is, various shapes may be employed as long as measurement light S is applied to the inside of keyhole 37 in a continuous pathway. In addition, the rotational direction of spin pathway 40 of the irradiation of laser light L may be either clockwise or anticlockwise relative to the welding direction.

In the present exemplary embodiment, laser light L and measurement light S are applied while moving laser light L and measurement light S in a spiral shape along welding path 34 in a linear shape. However, the welding path is not limited to being in a linear shape. For example, when laser light L is applied while laser emitting head 20 is moved by robot 18 in a spiral shape, it is possible that the welding path may become a spiral shape. When this is the case, the irradiation position of measurement light S may be orbitally moved on such a spiral-shaped welding path to probe bottom part 37a of keyhole 37.

Moreover, according to the present exemplary embodiment, the irradiation positions of laser light L and measurement light S are moved by means of laser emitting head 20 or robot 18. However, it is also possible to use a galvanoscanner or the like, as long as the laser irradiation position can be changed so as to follow a spiral-shaped pathway.

In addition, although the present exemplary embodiment describes a configuration in which two plates, upper metal plate 31 and lower metal plate 32, are overlapped in performing laser welding, it is also possible that three or more metal plates may be overlapped in performing laser welding.

Also, in the present exemplary embodiment, first collimating lens 21 and first focusing lens 22 are provided before beam splitter 25, and separately, second collimating lens 23 and second focusing lens 24 are also provided before beam splitter 25, in such a manner that focusing can be carried out separately. However, this embodiment is merely exemplary.

Figure 11:
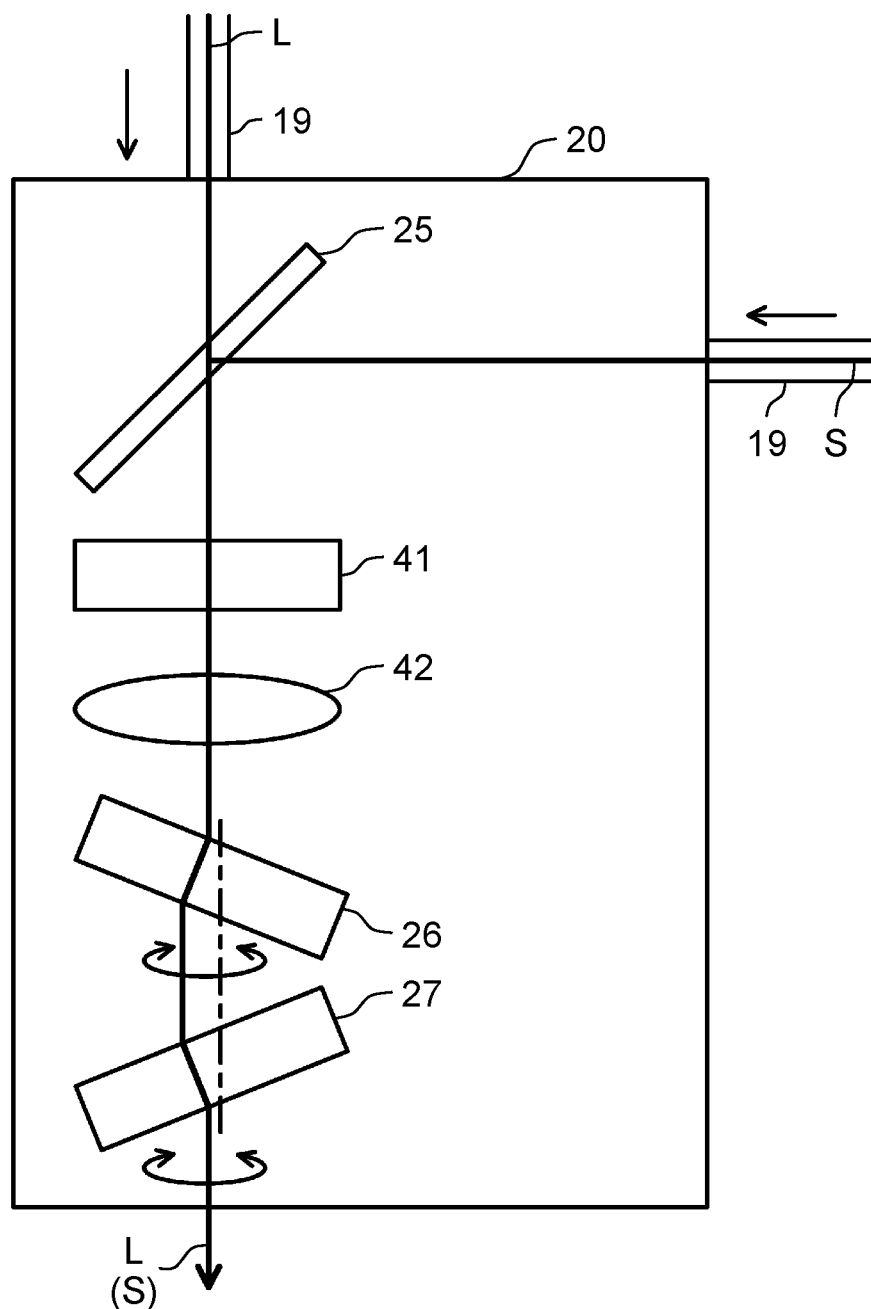
FIG. 11 is a schematic view illustrating the configuration of a laser emitting head according to another exemplary embodiment.

For example, the structure as illustrated in FIG. 11 may be employed in place of providing first collimating lens 21 and first focusing lens 22 as well as second collimating lens 23 and second focusing lens 24. That is, collimating lens 41 and focusing lens 42 are provided directly below beam splitter 25 so that laser light L and measurement light S are both focused after they have passed through beam splitter 25.

Specifically, it is preferable to employ a structure in which focusing is effected by a set of lens configuration including collimating lens 41 and focusing lens 42. When such a set of lens configuration is employed, it is more easy to perform adjustment of optical axis and securing of the lenses.

In addition, the present exemplary embodiment obtains the depth of the deepest part, which is the weld penetration depth, by sampling measured values in the bottom several percent when the bottom side is defined as the greatest side measured value of the weld penetration depth, and obtaining the average value thereof, specifically, obtaining the moving average value by, for example, continuously calculating average values within intervals SA, predetermined fixed time periods. However, this configuration is merely exemplary.

For example, it is also possible that measured values in the bottom several percent may be sampled for every interval SA, a predetermined fixed time period, and each value or each average value for every interval SA may be sampled, to calculate the sampled value as the measured value of the weld penetration depth.

Specifically, for example, interval SA, a predetermined fixed time period, is set to 50 msec, and while the measurement starting point for each interval SA is changed every 50 msec, the values in the bottom several percent of a plurality of data within interval SA may be continuously calculated. Alternatively, it is also possible that the values in the bottom several percent may be continuously obtained at every interval SA while changing the measurement starting point every 1 msec.

This makes it possible to identify the depth of the deepest part more accurately and more efficiently. Less computing processing is required for the computing process for the average value of the bottom several percent for each interval SA than for computing the average value as the moving average for each interval SA, a predetermined fixed time period, after sampling the bottom several percent of all the data. This means that the processing can be carried out in a relatively short time even when the performance of the memory of the computing unit or the like is low. Moreover, because less computing processing is required, the time for the computing process can be reduced, which is effective in reducing the production takt time in the processing and measuring process.

The following describes a case in which a measured value is acquired 1000 times in interval SA. In this case, the measurement interval is set to interval SA, a predetermined fixed time period, the interval SA is set to 50 msec, for example, and the measurement frequency (sampling frequency) is set to 20 kHz.

In this case, the measured value of the depth at the bottom 5th percentile rank of the 1000 measured values in interval SA when the bottom is the deepest part, that is, the measured value of the depth at the 50th rank from the bottom side, is sampled and employed as it is as the measured value of the weld penetration depth (i.e., averaging is not performed).

Further, for example, the measurement starting point of 50 msec interval SA is finely shifted by 2 msec so that the intervals overlap each other, and each value at the bottom 5th percentile rank is sampled as the measured value of the weld penetration depth.

This reduces the amount of memory necessary in computing, and lowers the burden on the CPU, making it possible to efficiently measure the weld penetration depth. In other words, the weld penetration depth can be obtained reliably like a simple moving average.

When there is no value at the bottom 5th percentile rank and there is only another value, such as the one at the bottom 4th percentile rank or the bottom 6th percentile rank, because of the setting of interval SA and the measurement frequency, the measured value at the bottom several percentile rank that is closest to the 5th percentile rank is sampled as the value at the bottom 5th percentile rank, and the sampled value is employed as the measured value of the weld penetration depth.

In this case, the permissible value of the bottom several percent range is preferably from equal to or greater than bottom side 1% to equal to or less than bottom side 20%. More preferably, the bottom several percent range is from equal to or greater than bottom side 3% to equal to or less than bottom side 7%, and in the range of approximately bottom side 5%.

Here, the number of times the measured values are obtained in interval SA is preferably from 100 times to 200 times or greater. The reason is that, if the number is less than 100 times, the number of times the measured values are obtained is so small that irregular values may be measured due to adverse effects originating from the conditions of keyhole 37 (such as collapse of keyhole and lapping of molten metal) in weld pool 36 and external disturbances (such as noises, vibrations, and fumes). If such is the case, it is difficult to remove such irregular values with high accuracy.

Accordingly, when the number of times the measured values are obtained is from 100 times to 200 times or greater, irregular values can be removed with high accuracy even if irregular values are measured.

Thus, even when the bottom 5th percentile rank does not exist, it is possible to identify a measured value that is in the range of from the bottom side 4% to the bottom side 6% as the measured value of the weld penetration depth. Therefore, the weld penetration depth can be identified accurately.

It should be noted beam splitter 25 may preferably be a dichroic mirror that reflects light with a specific wavelength and that passes through light with the rest of the wavelength.

In either case, it is possible to apply laser light L and measurement light S coaxially to weld part 35 of welding target object 30 by using an optical member that passes through the wavelength of laser light L but reflects the wavelength of measurement light S. As a result, a sufficient amount of light can be applied to the inside of keyhole 37, which is formed when weld part 35 is melted. Therefore, it is effective in identifying the keyhole depth.

The present exemplary embodiment has described that both of the irradiation positions of laser light L and measurement light S are moved in a spiral shape. In this case, the irradiation position of measurement light S may be moved together with laser light L. Alternatively, the irradiation position of measurement light S may be relatively moved relative to laser light L so as to move in a radius of rotation that is smaller than ½ of the spot diameter of laser light L.

When the irradiation position of measurement light S is relatively moved relative to laser light L, it is possible that the irradiation position of laser light L may be moved in a linear shape, and the irradiation position of measurement light S may be moved so as to be in a circular shape or a polygonal shape, such as a triangular shape or a quadrangular shape, as well as in a simple spiral shape. Hereinbelow, specific examples are described with reference to FIGS. 12 and 13.

Figure 12:
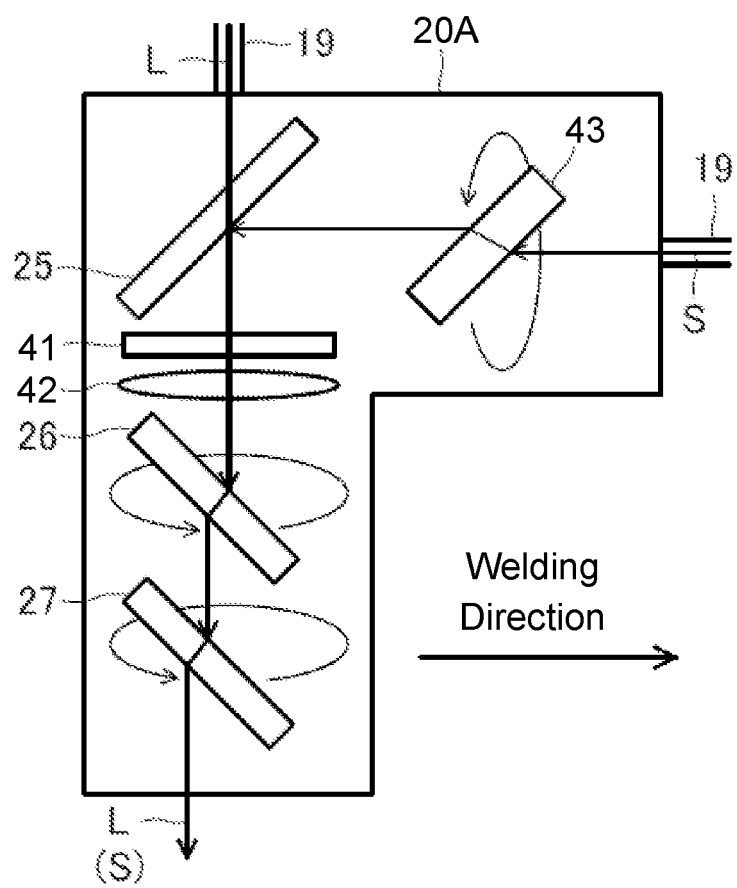
FIG. 12 is a schematic view illustrating the configuration of a laser emitting head according to a modified example.
Figure 13:
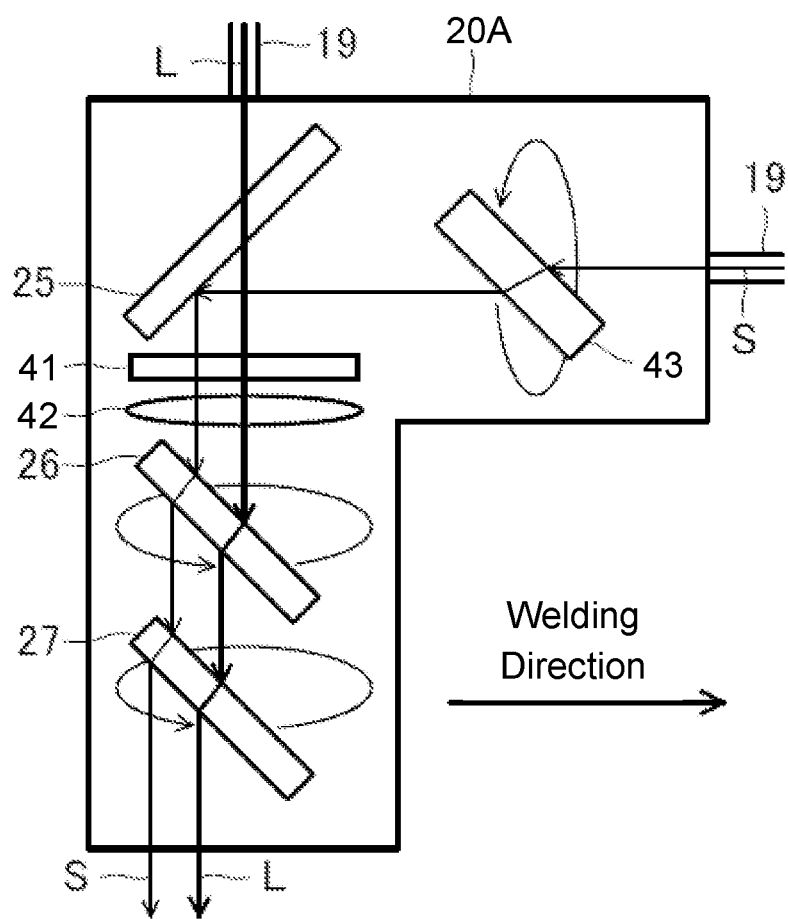
FIG. 13 is a schematic view illustrating how an optical path of measurement light is changed.

FIG. 12 is a schematic view illustrating the configuration of laser emitting head 20A according to a modified example. FIG. 13 is a schematic view illustrating how an optical path of measurement light S is changed. It should be noted that the same parts as described in the configuration of laser emitting head 20 shown in FIG. 11 are designated by the same reference numerals, and only the different points are described in the following.

As illustrated in FIG. 12 laser emitting head 20A includes third parallel plane plate 43, in addition to the configuration of laser emitting head 20 shown in FIG. 11.

Like first parallel plane plate 26 and second parallel plane plate 27, third parallel plane plate 43 is connected to a motor, not shown the drawings, to be rotated according to a command from controller 16, and it constitutes an irradiation position changer that is capable of changing the irradiation position of measurement light S. Measurement light S that has entered laser emitting head 20A passes through third parallel plane plate 43, so that the entry position into beam splitter 25 can be changed.

Specifically, when third parallel plane plate 43 is rotated so that third parallel plane plate 43 is adjusted to be at such an angle as shown in FIG. 12, measurement light S is applied to the position at which it is combined with laser light L that has transmitted through beam splitter 25. In this example, second parallel plane plate 27 is adjusted to be at an angle such as to be substantially in parallel to first parallel plane plate 26, which is different from the angle shown in FIG. 11.

Then, measurement light S is overlapped concentrically and coaxially with laser light L by beam splitter 25. Laser light L and measurement light S that have been overlapped coaxially with each other are collimated by collimating lens 41 and focused by focusing lens 42.

On the other hand, when third parallel plane plate 43 is rotated so that third parallel plane plate 43 is adjusted to be at such an angle as shown in FIG. 13, measurement light S is applied to a position that is rearward in the welding direction relative to laser light L that has transmitted through beam splitter 25. Specifically, in the example shown in FIG. 13, welding is performed while moving laser emitting head 20A in the rightward direction. As a result, measurement light S is refracted by beam splitter 25 at a position rearward (leftward) in the welding direction relative to laser light L, so that laser light L and measurement light S become parallel to each other. Then, laser light L and measurement light S are collimated by collimating lens 41 and focused by focusing lens 42.

By rotating third parallel plane plate 43 to adjust the angle as in the just-described manner, the irradiation position of measurement light S can be relatively moved relative to laser light L, and the irradiation position of measurement light S can be moved so as to be in a circular shape or a polygonal shape, such as a triangular shape or a quadrangular shape, as well as in a simple spiral shape.

Moreover, it is possible to perform processing at higher speed, in other words, in a shorter time, than when the irradiation position of laser light L is moved in a linear shape (so-called line-shaped processing) or in a spiral shape (so-called spin-shaped processing). Specifically, it is possible to probe bottom part 37a of keyhole 37 more finely while improving processing production takt by means of line-shaped processing, to more accurately measure the weld penetration depth inside keyhole 37.

It should be noted that, when the irradiation position of measurement light S is moved so as to be in a spiral shape, a circular shape, or a polygonal shape, the direction in which measurement light S is applied may be either clockwise or anticlockwise.

Furthermore, although this modified example shows an example in which the irradiation position of laser light L is moved in a linear shape, it is also possible to move the irradiation position of laser light L along spin pathway 40 with a relatively large diameter. In this modified example, the irradiation position of measurement light S is moved relatively independent of laser light L. Therefore, even when the irradiation position of laser light L is moved along spin pathway 40 with a relatively large diameter, the irradiation position of measurement light S can be changed so as to move in a radius of rotation that is smaller than ½ of the spot diameter of laser light L, in other words, the irradiation position of measurement light S can be changed so as to move on a predetermined welding path and the optical axis position as the irradiation position of measurement light S can be changed so as to move within a region having a radius of rotation that is smaller than ½ of the spot diameter of laser light L, to thereby move and rotate measurement light S at high speed. That is, it is possible to probe bottom part 37a of keyhole 37 more finely to measure the weld penetration depth inside keyhole 37.

In addition, the pathway of laser light L is not limited to a continuous one, but may be one that is formed discontinuously. That is, various shapes may be employed as long as the pathway is such that laser light L moves in the welding direction, which is the advancing direction of the moving pathway in which laser light L is applied, and measurement light S intersects laser light L applied to the inside of keyhole 37 when viewed in a plane along the irradiation direction of laser light L.

Note that laser emitting head 20A according to the modified example has been described as one in which collimating lens 41 and focusing lens 42 are provided directly below beam splitter 25 so that laser light L and measurement light S are both focused after they have passed through beam splitter 25, like laser emitting head 20 shown in FIG. 11. However, it is of course possible to provide first collimating lens 21 and first focusing lens 22 before beam splitter 25 and also second collimating lens 23 and second focusing lens 24 before beam splitter 25, respectively in the passing directions through which laser light L and measurement light S pass, so that laser light L and measurement light S can be focused separately.

INDUSTRIAL APPLICABILITY

As discussed above, the present disclosure makes it possible to measure the weld penetration depth of a weld part more accurately, which means that it can provide highly useful advantageous effects. Therefore, the present disclosure is remarkably useful and highly industrially applicable.

REFERENCE MARKS IN THE DRAWINGS 10 laser welding device
11 laser oscillator
12 optical interferometer
13 measurement light oscillator
14 measuring instrument
16 controller
17 determiner
18 robot
19 optical fiber
20 laser emitting head (irradiator)
20A laser emitting head (irradiator)
21 first collimating lens
22 first focusing lens
23 second collimating lens
24 second focusing lens
25 beam splitter
26 first parallel plane plate (irradiation position changer)
27 second parallel plane plate (irradiation position changer)
30 welding target object
31 upper metal plate
32 lower metal plate
34 welding path
35 weld part
36 weld pool
37 keyhole
37a bottom part
38 solidified portion
40 spin pathway
41 collimating lens
42 focusing lens
43 third parallel plane plate (irradiation position changer)
L laser light
r radius of rotation
S measurement light
RC center of rotation

The invention claimed is:

1. A laser welding method for welding a weld part with a laser light, the laser welding method comprising:
an irradiating step of overlapping the laser light and a measurement light having a different wavelength from a wavelength of the laser light coaxially with each other and applying the laser light and the measurement light to the weld part;
an irradiation position changing step of changing an irradiation position of the measurement light so as to move on a predetermined welding path, and changing an optical axis position being the irradiation position of the measurement light so as to move within a region of the weld part having a radius of rotation that is smaller than ½ of a spot diameter of the laser light;
a measuring step of repeatedly measuring a weld penetration depth of the weld part based on the measurement light that is reflected on the weld part while the measurement light is moving; and a determining step of determining the weld penetration depth of the weld part using a plurality of measured values of the weld penetration depth, the plurality of measured values being measured in the measuring step within a fixed time period for each of a plurality of time intervals, each of the plurality of time intervals having the fixed time period.

2. The laser welding method according to claim 1, wherein, in the irradiation position changing step, the irradiation position of the measurement light is moved together with the laser light, or the irradiation position of the measurement light is relatively moved relative to the laser light, when an irradiation position of the laser light and the irradiation position of the measurement light are both to be moved in a spiral shape.

3. The laser welding method according to claim 1, wherein, in the irradiation position changing step, an irradiation position of the laser light is moved in a linear shape and the irradiation position of the measurement light is moved so as to form a circular shape or a polygonal shape including a triangular shape and a quadrangular shape, when the irradiation position of the measurement light is to be relatively moved relative to the laser light.

* * * * *